US006876742B1

(12) United States Patent
Sacca

(10) Patent No.: US 6,876,742 B1
(45) Date of Patent: Apr. 5, 2005

(54) HIGH-VOLTAGE PROTECTION CIRCUITRY IN A DATA ACCESS ARRANGEMENT

(75) Inventor: Frank Sacca, Diamond Bar, CA (US)

(73) Assignee: Silicon Laboratories, Inc., Austin, TX (US)

( * ) Notice: Subject to any disclaimer, the term of this patent is extended or adjusted under 35 U.S.C. 154(b) by 591 days.

(21) Appl. No.: 09/676,742

(22) Filed: Sep. 29, 2000

(51) Int. Cl.[7] .......................... H04M 1/00; H04M 9/00; H04M 9/08
(52) U.S. Cl. .................................... 379/412; 379/27.05
(58) Field of Search ............................. 379/412, 27.05; 361/119

(56) References Cited

U.S. PATENT DOCUMENTS

| | | | |
|---|---|---|---|
| 5,642,416 A | * | 6/1997 | Hill et al. .................... 379/416 |
| 6,163,447 A | * | 12/2000 | Pitsch et al. ................ 361/119 |
| 6,351,530 B1 | * | 2/2002 | Rahamim et al. ...... 379/399.01 |

FOREIGN PATENT DOCUMENTS

WO    WO 9854813 A1 * 12/1998 ............ H02H/9/04

OTHER PUBLICATIONS

Teccor Electronics, Inc., "UL497B Protectors for Data Communication and Fire Alarm Circuits," SIDACtor Data Book, UL File No. E133083, Teccor Electronics, Inc., (4 pages).
BC Components, "Varistors," Product Specification, 2322 592 to 2322 595, 1999, May 17, (pp. 306, 315–328).

Silicon Update Online Body, "The Modem Squad," Jul. 5, 2000, (pp. 1–3).

* cited by examiner

Primary Examiner—Rexford Barnie
Assistant Examiner—Alexander Jamal
(74) Attorney, Agent, or Firm—Farjami & Farjami LLP

(57) ABSTRACT

A data access arrangement (DAA) having improved surge protection. The DAA incorporates a high voltage clamping device functioning to protect line side circuitry from signal paths created by EMI capacitors. In one embodiment of the invention, EMI capacitors are added between the "plus" and "minus" terminals of the diode bridge of the DAA to balance and reduce noise injection onto the TIP and RING lines. These EMI capacitors also reduce EMI interference. However, by adding EMI capacitors on this side (the "rectified side" or "line side") of the diode bridge, a high voltage signal path to earth ground is created that may have deleterious effects on the line side circuitry. To effectively negate undesirable signal paths through the EMI capacitors, the DAA includes a high voltage clamping device (e.g., a MOV, SIDACTor™, gas discharge tube or similar device) disposed between the plus and minus terminals of the diode bridge for suppressing high voltage spikes. The high voltage clamping device limits the voltage seen by the line side circuitry as a result of high voltage longitudinal surges by providing a current path from the plus terminal to the minus terminal of the diode bridge, thereby effectively bypassing the line side circuitry. The present invention recognizes and takes advantage of the fact that the diodes of a typical diode bridge are capable of withstanding the peak currents associated with most voltage surges.

17 Claims, 4 Drawing Sheets

HIGH-VOLTAGE PROTECTION CIRCUITRY IN A DATA ACCESS ARRANGEMENT

BACKGROUND

1. Technical Field

The present invention relates generally to communication devices for coupling to an external communication medium; and, more particularly, it relates to a telephone line data access arrangement providing improved surge protection.

2. Related Art

Regulatory agencies throughout the world have established standards and regulations for connecting subscriber equipment to telephone networks. These regulations are intended to prevent damage to the telephone network and mitigate interference with other equipment also connected to the network. The regulations, however, often present difficult design challenges.

According to the applicable regulatory standards of various countries, electrical and electronic equipment imported to or sold in these countries must neither cause excessive electromagnetic interference (EMI) nor be unduly susceptible to it (EMS). Compliance is often demonstrated by performing electromagnetic compliance (EMC) tests to recognized standards. FCC Part 15 (for unlicensed personal communication service devices) is exemplary of the regulatory requirements imposed on radiated or EMI emissions in the United States.

Products that must be tested generally include all electrical and electronic appliances, equipment and installations containing electrical and/or electronic components that are likely to cause or be susceptible to electromagnetic disturbances. A product achieves EMC when it is able to operate satisfactorily in its intended operating environment without causing EMI to other electronic equipment, and is itself able to operate satisfactorily without being adversely affected by EMI from other equipment operating in the same environment. Failure to pass an EMC compliance test may result in unacceptable delays in reaching the market place, expensive retrofitting of EMI control measures and/or other design modifications, removal of the equipment from the market and monetary penalties.

In addition to stringent EMI requirements, subscriber equipment or data communications equipment (DCE), such as a data modem, is generally required to provide for some form of electrical isolation to prevent voltage surges or transients originating from the subscriber equipment from having a deleterious effect on the telephone network and vice versa. Electrical isolation also addresses potential problems associated with differences in operating voltages between a telephone line and the subscriber equipment. More particularly, telephone line voltages may vary widely across a given network, and often exceed the operating voltage of subscriber equipment. In the United States, 1,500 volt isolation is currently required. In other countries, the prescribed isolation may reach 3,000–4,000 volts.

In the United States, certain of the voltage surge immunity requirements are set forth in the FCC Part 68. As stated therein, a main purpose of the FCC Part 68 Harmonized Requirements is to provide for uniform standards for the protection of a telephone network from harms caused by the connection of terminal equipment and associated wiring. The FCC Part 68 delineates two types of mandatory surge requirements—Type A and Type B surges on the telephone interface, both metallic (or horizontal) and longitudinal (or vertical). As defined in Part 68, Type B surges contain much lower energy than Type A surges. The two types of surges thus involve different fail-safe criteria. Part 68 compliance requires that both sets of fail-safe criteria be met.

Part 68 defines longitudinal voltage as one half of the vector sum of the potential difference between the TIP connection and earth ground, and the RING connection and earth ground for the TIP, RING pair of 2-wire and 4-wire connections; and, additionally for 4-wire telephone connections, one half of the vector sum of the potential difference between the TIP 1 connection and earth ground and the RING 1 connection and earth ground for the TIP 1, RING 1 pair (where TIP 1 and RING 1 are the receive pair). Part 68 further defines metallic or horizontal voltage as the potential difference between the TIP and RING connections for the TIP, RING pair of 2-wire and 4-wire connections and additionally for 4-wire telephone connections, between the TIP 1 and RING 1 connections for the TIP 1, RING 1 pair (where TIP 1 and RING 1 are the receive pair).

Some communications circuits, such as modems, employ a data access arrangement (DAA) having line side circuitry that includes a telephone (or other) network interface and system side circuitry including a host system interface. The line side circuitry and system side circuitry are separated by a high voltage isolation barrier (e.g., an isolation transformer or capacitive signal paths). Incoming and outgoing TIP and RING signals are generally communicated between line side circuitry and the TIP and RING connections via a diode bridge. Among other functions, the diode bridge prevents electrical damage to the DAA in the event of inverted wires in an RJ-11 jack.

The term DAA generally refers to circuitry, which provides an interface between a public telephone network originating in a central office (CO) and a digital data bus of a host system. The DAA electrically isolates a modem or similar device from a phone line to control emissions of electromagnetic interference/radio frequency interference (EMI/RFI). In addition to electrical isolation, the DAA often develops a number of signals (e.g., a ring signal) for provision to subscriber equipment. The DAA may receive signals from the phone line through a telephone jack, such as a RJ-11 connection as used for standard telephones.

Various circuits have been used to provide surge immunity in such communication circuitry. In a one typical arrangement, the telephone network interface includes a pair of "EMI" capacitors coupled between each of the TIP and RING signal lines and chassis ground or "earth ground". The EMI capacitors function to shunt relatively high frequency (e.g., 30 MHz–1 GHz) emissions to chassis ground in order to reduce EMI radiated emissions from the external telephone cord connected to the RJ11 jack of the DAA. The EMI capacitors may also be used to control longitudinal conducted emissions between TIP/RING and earth ground.

In addition, a varistor, such as a Metal Oxide Varistor (MOV), is often provided between the TIP and RING signal lines to provide protection from metallic/horizontal surges. The MOV is a voltage clamping device generally capable of absorbing very large currents without damage. By itself, a MOV is capable of holding typical telephone line surge voltages down to a level of approximately 400V peak, or at any other rated voltage specification.

SUMMARY OF THE INVENTION

Briefly, a communication device implemented in accordance with the present invention utilizes a data access arrangement (DAA) having improved surge protection. The DAA incorporates a high voltage clamping device functioning to protect line side circuitry from signal paths created by EMI capacitors.

In one embodiment of the invention, EMI capacitors are added between the "plus" and "minus" terminals of the diode bridge and earth or chassis ground to balance and reduce noise injection onto the TIP and RING lines. These EMI capacitors also reduce EMI interference. However, by adding EMI capacitors on this side (the "rectified side" or "line side") of the diode bridge, a high voltage signal path to earth ground is created that may have deleterious effects on the line side circuitry.

For example, if a relatively high voltage surge of 1 kV is present at the TIP signal (as referenced to the chassis or earth ground), the EMI capacitor between the plus terminal of the diode bridge and chassis ground may become charged to 1,000 volts minus a drop of approximately 1 volt across the diode bridge. However, since the other EMI capacitor between the minus terminal of the diode bridge and chassis ground is initially discharged, the line side circuitry can experience an initial voltage potential of approximately 1,000 volts. Therefore, this longitudinal voltage would appear after the diode bridge as a transient high voltage potential across the line side, and may be sufficient to destroy the line side circuitry, which is typically rated at approximately 400 volts.

More particularly, the line side circuitry may be subjected to excessive voltage for a span of time determined by the equivalent resistance of the line side circuitry and the value of the EMI capacitor(s) between the line side circuitry ground node (minus terminal of the diode bridge) and the chassis ground. Since line side circuitry is characteristically rated to operate only below certain voltage levels, high voltage energy transients in the line side EMI capacitors during surge conditions may cause the line side circuitry to fail. The typical placement of the MOV on the non-rectified side of the diode bridge does not adequately protect the line side circuitry connected to the rectified side of the diode bridge.

To effectively negate the undesirable signal path through the EMI capacitors to chassis ground, a DAA implemented in accordance with one embodiment of the present invention includes a high voltage clamping device (e.g., a MOV, SIDACTor™, gas discharge tube or similar device) disposed between the plus and minus terminals of the diode bridge for suppressing high voltage spikes. The high voltage clamping device limits the voltage seen by the line side circuitry as a result of high voltage longitudinal surges by providing a current path from the plus terminal to the minus terminal of the diode bridge, thereby effectively bypassing the line side circuitry. The present invention recognizes and takes advantage of the fact that the diodes of a typical diode bridge are capable of withstanding the peak currents associated with most voltage surges. The DAA is thus able to successfully and economically withstand surge voltages when EMI capacitors are added between the plus and minus terminals of the diode bridge to chassis ground, respectively.

Further a DAA according to the present invention has increased immunity to other problems that may be observed during high voltage transient tests. Even a metallic or horizontal surge, for example, may be accompanied by a longitudinal spike due to imperfections in the surge generator equipment. Again, such unexpected longitudinal spikes are suppressed by the disclosed DAA.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION

Figure 1:
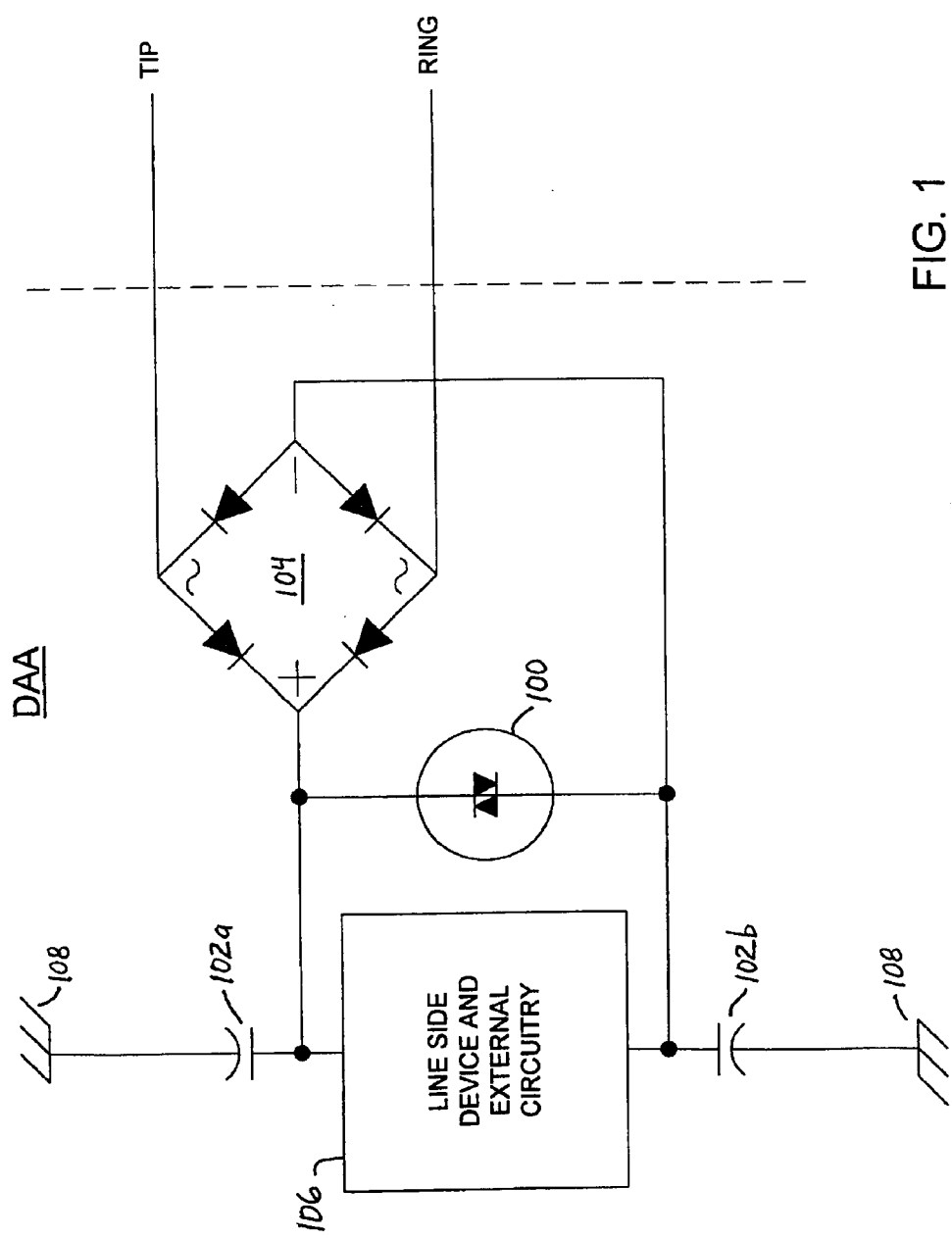
FIG. 1 is a schematic diagram of an exemplary data access arrangement incorporating voltage surge protection circuitry in accordance with the present invention.

FIG. 1 is a schematic diagram of an exemplary data access arrangement (DAA) incorporating voltage surge protection circuitry in accordance with the present invention. In this embodiment of the invention, a high voltage clamping device 100 (e.g., a MOV, SIDACTor™, gas discharge tube or a similar device) is disposed between the plus and minus terminals of a diode bridge 104 for purposes of suppressing high voltage spikes across the line side circuitry. The high voltage clamping device limits the high voltage that may be seen across the line side circuitry as a result of a longitudinal surge applied to the DAA when EMI capacitors 102*a* and 102*b* are coupled between the plus and minus terminals of the diode bridge 104 and a chassis ground node, respectively. The high voltage clamping device also limits the effects of metallic surges applied to the DAA. The EMI capacitors 102*a* and 102*b* function to balance and reduce noise injection into the TIP and RING signal lines of a telephone connection, and further operate to reduce EMI radiated and conducted emissions.

Although beneficial under certain circumstances, the inclusion of the EMI capacitors on the rectified side of the diode bridge 104 creates a high-voltage signal path from the TIP and RING terminals of the DAA to the chassis ground, exposing the line side circuitry to longitudinal high voltage surges and possibly resulting in deleterious effects on the DAA. For example, if a relatively high voltage surge of 1 kV is present at the TIP signal (with reference to the chassis or earth ground), the associated EMI capacitor 102*a* will become charged to 1,000 volts minus a drop of approximately 1 volt across the diode bridge. However, since the other EMI capacitor 102*b* between the minus terminal of the diode bridge and chassis ground is initially discharged, the line side circuitry can experience an initial voltage potential of approximately 1,000 volts. Therefore, this longitudinal voltage would appear after the diode bridge as a transient high voltage potential across the line side, and may be sufficient to destroy the line side circuitry, which is typically rated at approximately 400 volts. The inclusion of the high voltage clamping device, however, allows the DAA to successfully and economically withstand surge voltages by limiting the energy which can be stored in the EMI capacitor 102*a* and 102*b*.

Referring more particularly to FIG. 1, the TIP and RING signal lines of a telephone connection are coupled to a diode bridge 104 in a conventional manner. As known to those of skill in the art, the diode bridge 104 ensures that the same polarity of DC signal is present at its plus and minus terminals regardless of the DC polarity of the TIP and RING connections. Line side circuitry 106 (examples of which are discussed more fully below in conjunction with FIG. 3 and FIG. 4) is coupled between the plus and minus terminals of the diode bridge 104.

In this embodiment of the invention, the EMI capacitor 102a is coupled between the plus terminal of the diode bridge 104 and an earth or a chassis ground node 108. Likewise, the EMI capacitor 102b is coupled between the minus terminal of the diode bridge 104 and a chassis ground node 108. The line side circuitry/device 106 is coupled in a traditional manner between the plus and minus terminals of the diode bridge 104.

In this embodiment of the invention, a voltage clamping device 100 is advantageously coupled between the plus and minus terminals of the diode bridge 104. In this manner, the maximum voltage to which the line side circuitry 106 may be exposed is limited to the voltage rating of the voltage clamping device 100, both for longitudinal and metallic high voltage surges. The voltage clamping device 100 is selected such that transistors and other sensitive circuitry of the line side circuitry 106 are not subjected to a voltage level that causes permanent damage.

The voltage clamping device 100 may take many forms, including a varistor. In one contemplated embodiment, the voltage clamping device 100 is a varistor comprised of a disc of low-B ceramic material with two tinned solid copper leads. Such varistors may be packaged to be suitable for processing on automatic insertion, cutting and bending equipment to aid in the manufacturing process. Varistors having various maximum voltage and current ratings may be utilized. For example, a varistor having a specified maximum continuous voltage of 175 Vrms (volts root mean square) and a maximum voltage of 410–455 volts at a current of between 5 amps and 50 amps and a maximum non-repetitive transient current in the range of 1,200 amps may be utilized in one embodiment of the invention.

A DAA in accordance with the invention can be utilized with any product that interfaces a telephone network 110 connection to any digital signal processor technology, or any processor of host system circuitry 216 that performs analog modem modulations. Examples include, but are not limited to, data modems, computers, web browsers, set top boxes, home gateway devices, fax machines, cordless telephones and telephone answering machines. In addition, many different interfaces with the telephone network 110 and/or other transmission media are contemplated, such that the DAA may be configured to be compatible with whichever means is utilized.

In addition, the DAA may operate in compliance with one or more standards, such as xDSL. The term "xDSL" is used herein to collectively refer to several different types of DSL technology (e.g., HDSL, VDSL, ADSL, etc.), as well as variants currently under development or yet to be developed. This technology utilizes the local-loop copper connection between a network service provider (NSP) and a customer premises. xDSL is capable of providing simultaneous high-speed digital data access and Plain Old Telephone Service (POTS) over the same twisted-pair wiring. For example, splitterless ADSL componentry, such as that compliant with the ITU G.lite/G.992.2 specification, may be employed in conjunction with the present invention.

It is further contemplated that the DAA may comply with a number of home networking and communication protocols, such as the Home Phoneline Networking Alliance's (Home PNA) 1M8 (1 Mbps) or 10M8 (10 Mbps) home networking standards, or one of the aforementioned xDSL technologies. A home phone line network compliant with a Home PNA standard may form an Ethernet-compatible LAN running over telephone cabling found in most homes, and does not require any additional hubs, routers, splitters, filters or terminations. Compliant home networking products enable a variety of home computing opportunities, including: shared internet access using a single phone line, printers/peripheral sharing, file and application sharing, and networked gaming. This same home networking technology can also be used to connect a variety of intelligent consumer appliances such as television-based digital set top boxes, internet phones, digital cameras, and multifunction printers.

Figure 2:
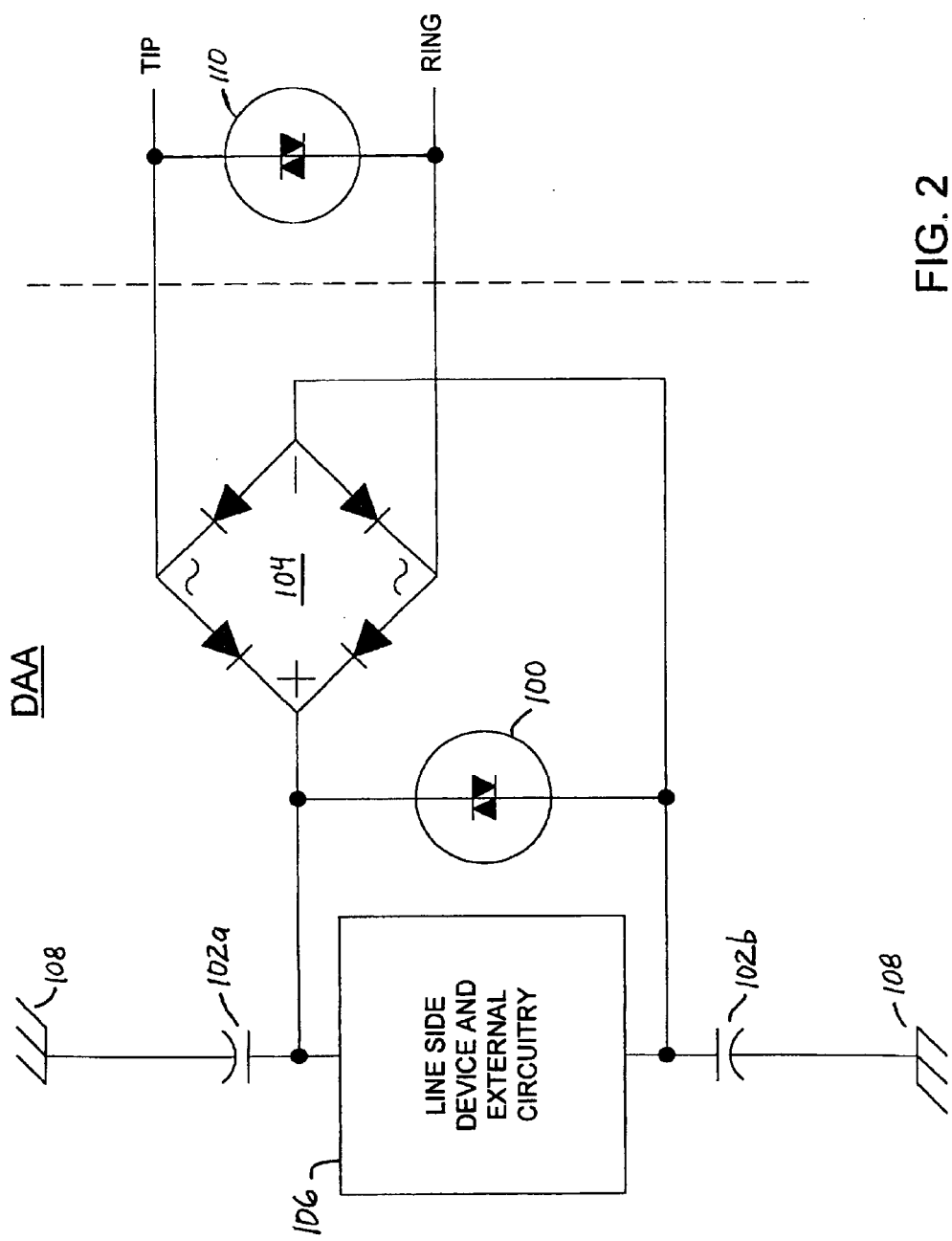
FIG. 2 is a schematic diagram of an alternate embodiment of a data access arrangement according to the present invention.

FIG. 2 is a schematic diagram of an alternative embodiment of a DAA according to the present invention. In this embodiment, the DAA of FIG. 1 further includes one or more additional voltage clamping devices 110 that are coupled between the TIP and RING signal lines in a traditional manner, as shown in FIG. 2. Adding clamping device 110 on the non-rectified side of the diode bridge 104 helps reduce the peak current through the diode bridge 104 during metallic high-voltage surges, by effectively shunting most of the current between TIP and RING before clamping device 100 is activated.

The amount of current flowing through clamping devices 100 and 110 of FIG. 2 during high-voltage conditions is largely a function of the voltage rating of the selected devices. In general, clamping device 100 protects line side circuitry 106 from longitudinal surges and clamping device 110 protects the line side circuitry 106 from metallic surges.

Figure 3:
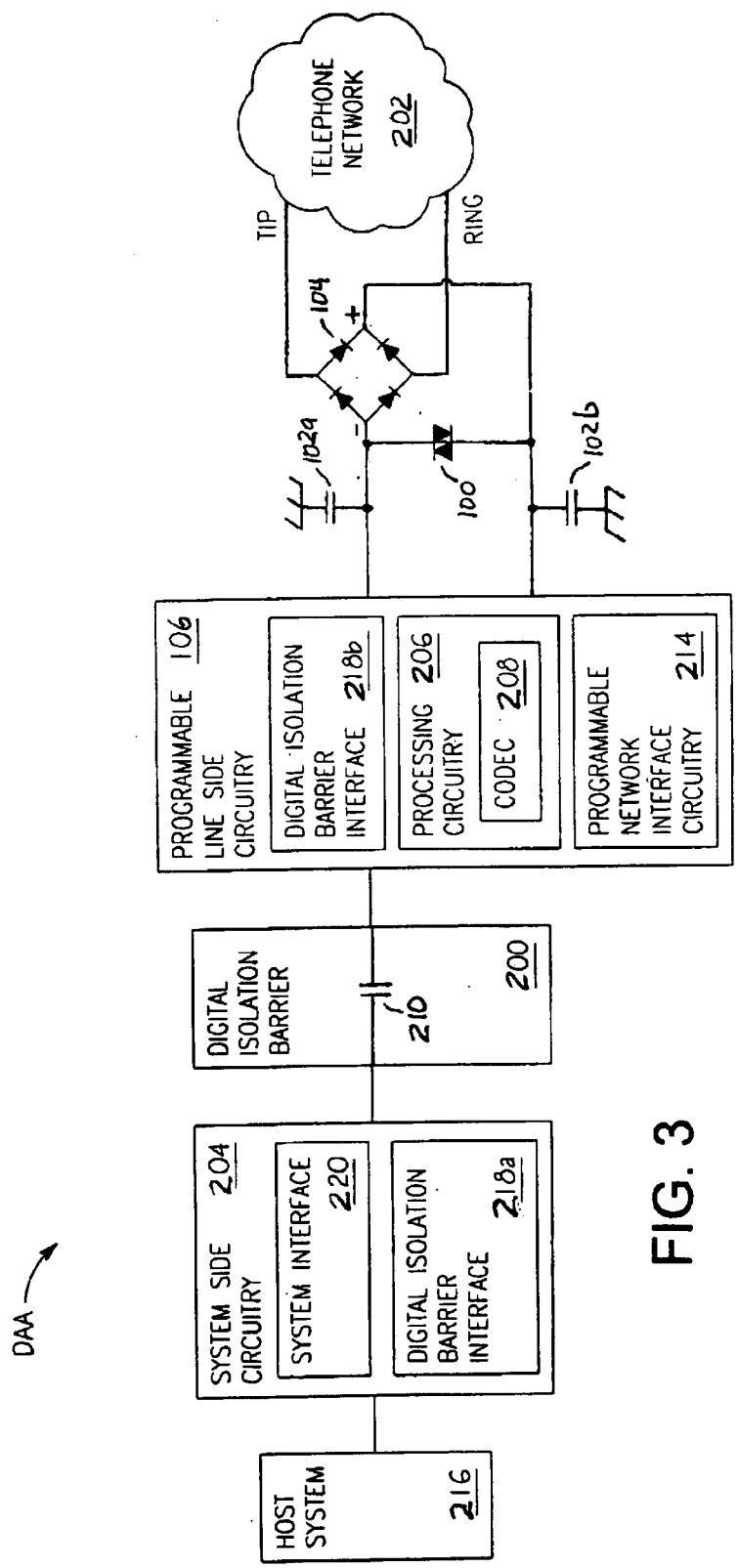
FIG. 3 is a schematic diagram providing exemplary details of a communication device utilizing the data access arrangement of FIG. 1.

FIG. 3 is a schematic diagram providing exemplary details of a communication device using the DAA of FIG. 1. The DAA couples the communication device of a host system 216 to the TIP and RING signal lines of a telephone network 202. In addition to the voltage clamping device 100, EMI capacitors 102a and 102b, and diode bridge 104, the DAA comprises a digital isolation barrier 200 for communicatively coupling line side circuitry 106 to system side circuitry 204. The digital isolation barrier 200, in conjunction with features of the line side circuitry 106 that interface with the telephone network 202, provides the necessary level of electrical isolation between the line side circuitry 106 and the corresponding system side circuitry 204.

The digital isolation barrier 200 is designed to comply with both U.S. and international requirements for isolation. In the illustrated embodiment, the digital isolation barrier 200 comprises a single isolation capacitor 210 providing a signal path for bi-directional communication of a serial data stream.

Numerous other embodiments for the distal isolation barrier 200 are contemplated. For example, the digital isolation barrier may comprise a pair of capacitors supporting differential communications, and may further include other circuitry such as a transformer for communicating clock and power signals from this system side circuitry 204 to the line side circuitry 106. Data, control and programming signals may all be communicated between the system side circuitry 204 and the line side circuitry 106.

The system side circuitry 204 of the disclosed embodiment includes a system interface 220 and a digital isolation barrier interface 218a. The system interface 220 coordinates communications with the host system circuitry 216, while the digital isolation barrier interface 218a establishes communications with the digital isolation barrier 200.

The line side circuitry 106 includes a digital isolation barrier interface 218b corresponding to the digital isolation barrier interface 218a of the system side circuitry 204. The line side circuitry 106 also includes processing circuitry 206 and programmable telephone network interface circuitry 214. Many functions are performed by the programmable telephone network interface circuitry 214, including measuring and establishing electrical parameters that are reflective of the condition of the lines of telephone network 202.

The processing circuitry 206 of FIG. 3 includes a coder/decoder (CODEC) 208. The CODEC 208 functions to encode the analog signal on the lines of the telephone network 202 into a digital format, and also provides decoded digital signals for analog transmission over the telephone network 202. In a conventional DAA, a CODEC is disposed on the system side of the high voltage isolation barrier. In the described embodiment, however, the CODEC 208 is advantageously included on the line side of the digital isolation barrier 200 to facilitate communications with the line side circuitry 106. In addition, placement of the CODEC 208 and other circuitry/functions on the line side reduces the number of signals communicated across the digital isolation barrier 200 and facilitates programmability of the network interface circuitry 214.

Programmability of the network interface circuitry 214 may be achieved in a variety of ways. For example, if the host system circuitry 216 desires to program a particular feature of the line side circuitry 106 (e.g., vary line/ring impedance), a command or programming signal is communicated to the system side 204. The command or programming signal may then be reconfigured for transmission to the line side circuitry 106 in a digital manner via the digital isolation barrier 200. Alternatively, the command or programming signal may originate in the line side circuitry 106, where it will be directed towards the system side circuitry 204 by the line side circuitry 106. Command or programming signals may be multiplexed and serialized for transmission across the digital isolation barrier 200, thereby reducing the complexity and expense of the digital isolation barrier. Data signals may also be combined with command or programming signals, further simplifying the digital isolation barrier 200.

The digital isolation barrier interface 218a of the disclosed embodiment may include clock/power driver circuitry, as well as protocol framing and control circuitry and a transceiver, which coordinate bi-directional transfer of data, control, and programming signals across the digital isolation barrier 200. The clock and power driver circuitry may be responsible for transferring power and clock signals across the digital isolation barrier 200 to the line side circuitry 106, and may be further programmable by the system side circuitry 204 to include a number of different power states, depending on the on-hook status of the DAA.

The system interface circuit 220 may be configured to communicate with the host system 216 in a variety of ways. For example, the system interface circuit 220 may interface directly with a controller-less host architecture. A high-speed serial data interface or a parallel data interface with various I\O lines for modem control and DAA status may also be used. Further, a call progress monitor and a caller ID (CID) control and storage circuit may be included in the system side circuitry 204.

The processing circuitry 206 of the line side circuitry 106, in addition to comprising a CODEC 208, may also include conversion and detection circuitry, such as that described in greater detail below in conjunction with FIG. 4. Memory may also be provided by use the processing circuitry 206 to store electrical specifications and configurations related to the regulatory requirements of various countries.

Figure 4:
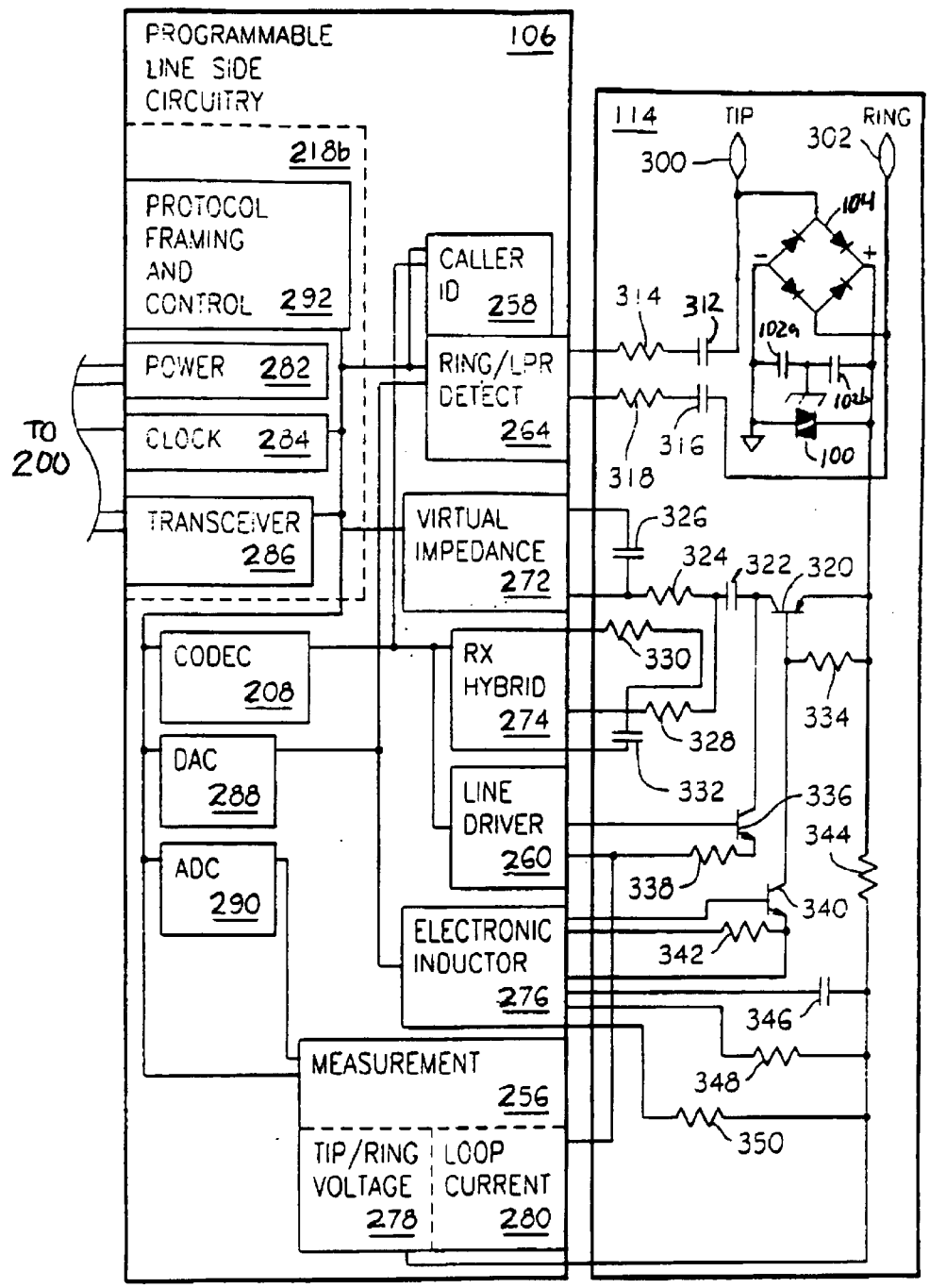
FIG. 4 is a drawing providing exemplary details of the line side circuitry of the data access arrangement of FIG. 1.

FIG. 4 is a drawing providing exemplary details of the line side circuitry 106 of the DAA of FIG. 1. The line side circuitry 106 may include a variety of programmable functions. For example, programmable measurement circuitry may be provided with adjustable parameters for measuring TIP/RING voltage and loop current conditions on the lines of a telephone network 202, as well as monitoring and execution of commands from the system side circuitry 204. The line side circuitry 106 includes an analog-to-digital space converter (ADC) 290 and a digital-to-analog converter (DAC) 288 for supporting various functionality. The DAC 288 and ADC 290 may operate as part of the CODEC 208, or may be separate circuits for use by other components of the line side circuitry 106.

For example, the DAC 288 of the disclosed embodiment is used by a RING/line polarity reversal (LPR) detection circuit 264 and an electronic inductor 276. Similarly, the ADC 290 operates in conjunction with the TIP/RING voltage measurement circuit 278 and loop current measurement circuitry 280. The RING/LPR detection circuitry 264 of the disclosed embodiment is programmable to comply with both U.S. and international requirements. The RING/LPR detection circuitry 264 functions to provide RING wake bit signals. In addition, the RING/LPR detection circuitry 264 is configurable to provide line current sensing information for use by remote on-hook detection circuitry, extension off-hook detection circuitry and digital PBX functions.

It is contemplated that the CODEC 208 of the disclosed embodiment of the invention may be a 16 bit, 16 kHz second order sigma-delta CODEC used for sampling analog signals on the telephone network 202, and to provide such signals to the telephone network 202.

The caller ID circuit 258 receives and decodes caller identification information from the telephone network 202. To this end, it includes a relatively simple ADC and demodulator complying with one or more standards (e.g., V.23/Bell 202, ETSI 300). It is also capable of transferring caller identification information across the digital isolation barrier 200 in a low power state, and is programmable to provide caller ID information without a RING or line polarity reversal.

Signals are provided by the DAA to the telephone network 202 via line driver circuitry 260. The line driver 260 of the disclosed embodiment is programmable to drive signals having the electrical characteristics prescribed by the country in which the DAA is being used. Virtual impedance circuitry 272 is also provided to allow the DAA or host system circuitry 216 to program the electrical characteristics of the DAA as seen by the telephone network 202 to facilitate compliance with a variety of regulatory standards, including country-by-country ring loading. Values measured by the measurement circuitry 256 may be used in this process.

Further contemplated components of the programmable network interface circuitry 214 include, for example: filtering circuitry, pulse dialing circuitry, hook switch circuitry, general purpose I/O lines, line current sensing for digital PBX detection, measurement circuitry for determining Central Office battery and loop DC resistance, line-in use indicators, PABX digital line detection circuitry, and host controlled worldwide DC masks. Many of the disclosed features allow the host system circuitry 216 to easily ascertain the condition of the telephone network 202.

The digital isolation barrier interface 218b of this embodiment includes a protocol framing and control circuit 292 that functions to organize data transmitted by a transceiver 286. The protocol framing circuit 292 also deconstructs signals received by the transceiver 286 from the system side circuitry 204. In addition, an optional power regulation circuit 282 is provided if the line side circuitry 106 receives power from the system side circuitry 204. Likewise, a clock circuit 284 is provided in the digital isolation barrier interface 218b to receive a signal from the system side circuitry 204 for use in generating clock signals for the logic of the line side circuitry 106.

A hybrid circuit 274 is coupled to the CODEC 208 for performing two-wire to four-wire conversion functions and to provide incoming signals to the CODEC 208. A line driver circuit 260 is also coupled to the CODEC 208 and other analog circuitry of the programmable network interface 214. The line driver circuit 260 provides signals from the CODEC 208 to the TIP and RING signal lines.

The analog circuitry of the programmable network interface 214 (which may be considered part of the line side circuitry 106) includes a bipolar junction transistor 320 having an emitter that is coupled to the "+" or plus terminal of the diode bridge 104, while its collector is coupled to a capacitor 322 and a transistor 336. The transistor 320, in conjunction with a resistor 334 coupled between its emitter and base, functions to isolate the virtual impedance circuit 272 and the hybrid circuit 274 from the telephone connection when in an on-hook condition. The virtual impedance circuit 272 is coupled to the capacitor 322 via a capacitor 326 and resistor 324, while the hybrid circuit 274 is coupled to the capacitor 322 via resistors 328 and 330 and a capacitor 332. In the disclosed embodiment, these resistors and capacitors provide signal gain/conditioning to allow the virtual impedance circuit 272 and hybrid circuit 274 to operate at a variety of TIP/RING voltage levels. The transistor 320 and the resistor 334 are not required in certain contemplated applications.

The transistor 336 and resistor 338, which are coupled to the line driver circuit 160, allow the line side circuitry 106 to provide signals to the TIP and RING connections 300 and 302 via the diode bridge 104. More specifically, modulation of the base-collector voltage of the transistor 336 allows an AC signal to be presented on the TIP and RING connections 300 and 302.

A transistor 340 having a collector coupled to the base of the transistor 320, in conjunction with the resistor 342, draw line current from the telephone connection of provision to the electronic inductor 276 to indicate off-hook conditions. The electronic inductor 276 operates in conjunction with the DAC 288, ADC 290 and software control functionality of the DAA. The electronic inductor 276 is also coupled to the "+" or plus terminal of the diode bridge 104 via resistors 344 and 348 are utilized to determine if the TIP and RING connection 300 and 302 voltages reflect an on hook condition.

The loop current measurement circuitry 280 is also coupled to the emitter of the transistor 340 in order to measure current levels present on the TIP and ring conductors 300 and 302. The TIP/RING voltage measurement circuit 278 is coupled to the "+" or plus terminal of the diode bridge 104 via the resistor 344.

The DAC 288 and ADC 290 are utilized in the disclosed embodiment to aid in measuring currents and voltages in the TIP and RING connections 300 and 302, and for providing related information to the protocol framing and control circuit 292 for provision to the system side circuitry 204. The DAC 288 and ADC 290 are programmable to allow modifications to the current and voltages on the TIP and RING connections 300 and 302 (e.g., the line side circuitry 106 can be programmed to draw more current from the TIP and RING connections 300 and 302 to lower telephone line voltages as may be required in a specific country).

Thus, a data access arrangement has been described that includes a high voltage clamping device disposed across the rectified side of a diode bridge for suppressing high voltage spikes. The high voltage clamping device limits the energy that can be stored across EMI capacitors located on the rectified side of the diode bridge. The disclosed embodiment of the invention utilizes the fact that diodes of a typical diode bridge are capable of withstanding peak currents associated with most voltages, and economically improves the surge protection capability of the data access arrangement.

In view of the above detailed description of the present invention and associated drawings, other modifications and variations will now become apparent to those skilled in the art. It should also be apparent that such other modifications and variations may be effected without departing from the spirit and scope of the present invention.

I claim:

1. A data access arrangement for use in a communications device having a chassis ground, the data access arrangement circuit comprising:

programmable line side circuitry, including network interface circuitry;

a diode bridge having a first pair of terminals for coupling data signals to a network connection and a second pair of terminals coupled to the network interface circuitry;

a high voltage clamping device disposed between the second pair of terminals;

a first capacitor coupled between the chassis ground and one of the terminals of the second pair of terminals; and a second capacitor coupled between the chassis ground and the other terminal of the second pair of terminals;

thereby limiting a maximum voltage to which the programmable line side circuitry can be exposed to substantially a voltage rating of the high voltage clamping device for longitudinal and metallic high voltage surges.

2. The data access arrangement of claim 1, further comprising:

at least one additional high voltage clamping device disposed between the terminals of the first pair of terminals.

3. The data access arrangement of claim 1, the communications device having a chassis ground, further comprising:

a third capacitor coupled between the chassis ground and one of the terminals of the first pair of terminals; and a fourth capacitor coupled between the chassis ground and the other terminal of the first pair of terminals.

4. The data access arrangement of claim 1, wherein the network connection is an RJ-11 jack for coupling to a telephone line.

5. The data access arrangement of claim 1, wherein the high voltage clamping device is a metal oxide varistor.

6. The data access arrangement of claim 1, wherein the high voltage clamping device is a SIDACTor™.

7. The data access arrangement of claim 1, the high voltage clamping device having a maximum specified voltage rating between 410 volts and 455 volts at a maximum specified current rating between 5 amps and 50 amps.

8. The data access arrangement of claim 1, further comprising:

system side circuitry configurable to communicate with a host system; and a high voltage isolation barrier having a first side and a second side, the first side coupled to the network interface circuitry and the second side coupled to the system side circuitry.

9. The data access arrangement of claim 8, the high voltage isolation barrier comprising a capacitor.

10. The data access arrangement of claim 1 operating in substantial compliance with an xDSL modem standard.

11. The data access arrangement of claim 1 operating in substantial compliance with a home networking protocol.

12. A data access arrangement for use in a communications device having a chassis or earth ground, the data access arrangement circuit comprising:

programmable line side circuitry, including network interface circuitry;

a diode bridge having a first pair of terminals for coupling data signals to a network connection and a second pair of terminals coupled to the network interface circuitry;

a first high voltage clamping device disposed between the chassis ground and one of the terminals of the second pair of terminals;

a second high voltage clamping device coupled between the chassis ground and the other terminal of the second pair of terminals;

a first capacitor coupled between the chassis ground and one of the terminals of the second pair of terminals; and a second capacitor coupled between the chassis ground and the other terminal of the second pair of terminals;

thereby limiting a maximum voltage to which the programmable line side circuitry can be exposed to substantially a voltage rating of the high voltage clamping device for longitudinal and metallic high voltage surges.

13. The data access arrangement of claim 12, wherein the high voltage clamping device is a metal oxide varistor.

14. A communications device comprising:

a chassis ground;

host processing circuitry;

system side circuitry coupled to the host processing circuitry;

programmable line side circuitry, including network interface circuitry;

a voltage isolation barrier having a first side and a second side, the first side coupled to the network interface circuitry and the second side coupled to the system side circuitry;

a diode bridge having a first pair of terminals for coupling data signals to a network connection and a second pair of terminals coupled to the network interface circuitry;

a high voltage clamping device disposed between the terminals of the second pair of terminals;

a first capacitor coupled between the chassis ground and one of the terminals of the second pair of terminals of the diode bridge; and a second capacitor coupled between the chassis ground and the other terminal of the second pair of terminals of the diode bridge;

thereby limiting a maximum voltage to which the programmable line side circuitry can be exposed to substantially a voltage rating of the high voltage clamping device for longitudinal and metallic high voltage surges.

15. The communications device of claim 14, wherein the high voltage clamping device is a metal oxide varistor.

16. The communications device of claim 14, wherein the network connection is an RJ-11 jack for coupling to a telephone line.

17. The communications device of claim 14, the high voltage isolation barrier comprising a capacitor.

* * * * *